June 5, 1951  R. D. WHITTINGTON  2,556,130
BODY EXTENSION FOR MOTOR VEHICLES
Filed Aug. 12, 1946
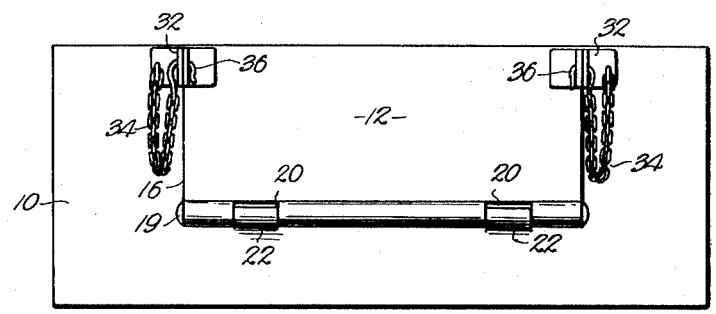
Fig. 1.
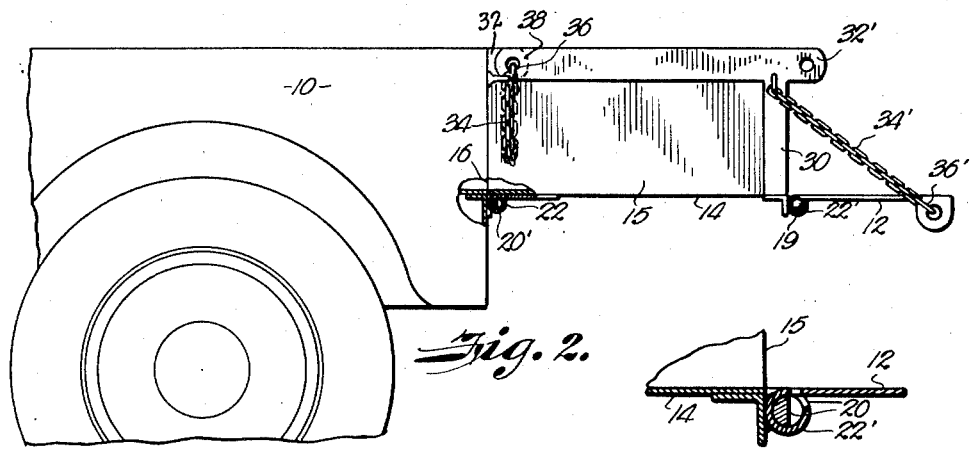
Fig. 2.
Fig. 4.
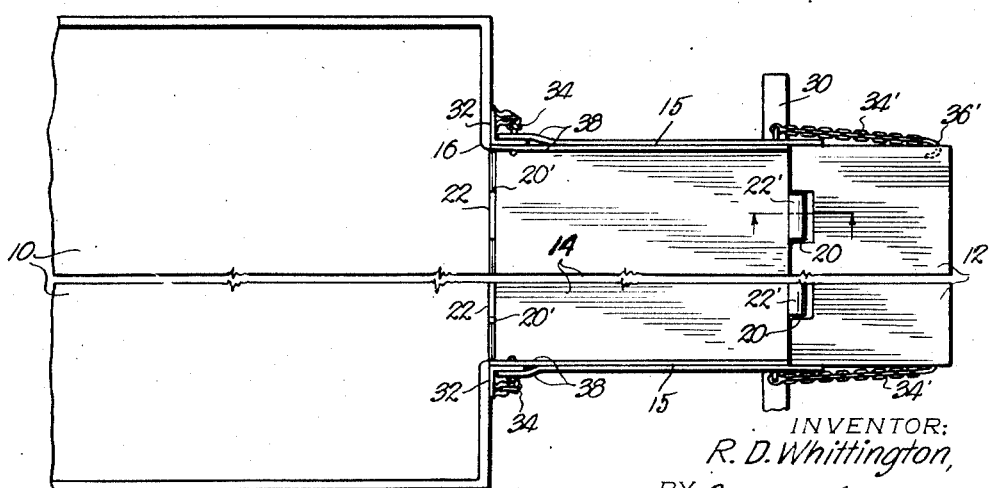
Fig. 3.
INVENTOR:
R. D. Whittington,
BY Chas. W. Girard
ATTORNEY.

Patented June 5, 1951

2,556,130

UNITED STATES PATENT OFFICE 2,556,130

BODY EXTENSION FOR MOTOR VEHICLES

Roy D. Whittington, Belton, Mo., assignor of one-half to William Isler and one-half to Julius A. Negin and Ludwig J. Gaspar, Jr., jointly, all of Cleveland, Ohio Application August 12, 1946, Serial No. 690,019

3 Claims. (Cl. 296—28)

The present invention relates to vehicle construction, and particularly to commercial vehicles such as trucks and the like, and aims to provide a practical form of extension for the body portion of such vehicles.

The invention has special reference to the commercial type of motor vehicles such as have been known generally as jeeps in the army service, and which has a body of limited proportions and some forms of which have an endgate at the rear end of the body.

Accordingly an object of the invention is to provide an extension of the body structure of this type of vehicle in the form of an accessory unit which is adapted to be mounted in the manner of a replacement for the endgate of the vehicle body and to receive said engate as a supplemental attachment serving the endgate function for said accessory unit.

For accomplishing said primary object of the invention, the same provides an accessory extension unit of simple and compact construction adapted to be attached in the same relation as the endgate of the vehicle to which it is applied, and also provided with structural features duplicating those of the vehicle and permitting the endgate to be transferred to and attached to the accessory unit in the same relation as when attached to the vehicle body itself.

With the foregoing general objects in view, the invention will now be described by reference to the accompanying drawing illustrating one form of construction which I have devised for embodying the proposed improvements, after which those features and combinations deemed to be novel and patentable will be particularly set forth and claimed.

In the drawing:

Figure 1 is a rear end view, showing a vehicle or jeep type of body having a detachable endgate member latched in upright or closed position;

Figure 2 is a side elevation of the rear end portion of the vehicle having the improved body extension unit mounted in place as an extension to the jeep body, and the endgate member transferred and mounted to serve as an endgate for said unit and shown lowered into horizontal or open position;

Figure 3 is a plan view of the same; and

Figure 4 is a detail sectional view of the endgate hinge construction.

Referring now to the accompanying drawing in detail, this illustrates the proposed accessory improvements in relation to the body portion 10 of the so-called jeep type of military service car. As ordinarily constructed this body is of relatively limited proportions, and correspondingly limited capacity as regards the transporting of other materials. Moreover the said body of the vehicle can not well be extended permanently to the rear because of the power take-off connection or other accessories provided at the rear of the vehicle body and its drive, which would be interfered with by the cutting off of proper access thereto if any permanent extension of the body were made.

Some of these types of jeep bodies are provided with hinged endgate members, and what is proposed by the present invention is the provision of an accessory extension unit of sufficient size to provide the desired additional capacity of the vehicle body, but designed to form only a temporary extension thereof, such as would permit its removal and a return to the normal body proportions of the car, particularly when access should be desired to the power takeoff facilities thereof. Accordingly, I have devised an accessory construction which is adapted to be mounted as a replacement in lieu of the aforesaid engate member and attached to the car by the same type of attaching means as said endgate, and which furthermore preserves said endgate member as part of the accessory unit wherein it performs the same endgate function as in its original position on the car body.

For carrying out this construction, I provide a body extension member having the floor 14 and side walls 15 of the same width and vertical dimensions as the endgate member 12, so as in effect to form a rearward extension of said body from its endgate opening 16, as illustrated in Figures 2 and 3. At the same time the endgate member 12 is made detachable from the body 10 by means of semicylindrical trunnion or hinge elements 20 detachably engaged with open bearing elements or hinge hooks 22 at the lower side of the endgate opening 16; and moreover, these detachable hinge features are duplicated in the proposed accessory unit, by providing the attaching end of the extension member with an axle portion having similar semicylindrical or halfround trunnion elements 20' for detachable engagement with said bearing elements or hooks 22, whereas at the opposite end of the extension member its floor 14 is provided with an additional set of opening bearing elements or hooks 22' for permitting the removable mounting therein of the elements 29 of the endgate member 12 and thus allowing the latter to serve as a temporary endgate member for the said rear end of the extension member, as represented in Figures 2 and 3.

In addition, this rear end of the accessory extension unit is provided with bracing means as indicated at 30, and also with perforated lugs 32' corresponding to the lugs 32 of the jeep body for use in latching the endgate in upright or closed position; and also supplemental chains 34' and hooks 36' similar to corresponding elements 34 and 36 of the jeep body for serving the same latching function as well as supporting means for supporting the endgate in open or lowered position, as illustrated in Figures 2 and 3.

Moreover, the upper corners of the accessory unit are provided (at its front or attaching end) with spaced perforated portions 38 adapted to fit or telescope over the perforated lugs 32, to facilitate locking engagement therewith by means of the aforesaid hook elements 36 in securing said accessory or extension unit in operative position as shown by the drawing.

From the foregoing, therefore, it will be apparent that I have devised an advantageous accessory device for serving as an extension to the normal vehicle body and materially increasing the capacity thereof in a very convenient and efficient manner; and that in addition to enabling the single endgate unit to serve in either of the two alternative operative positions illustrated, the extension unit itself may at any time be dispensed with and thus avoid any interference with the use of the other facilities of the vehicle, such as its power takeoff, etc., in the regular manner.

While I have illustrated and described what I now regard as the preferred and most practical form of embodiment of the proposed improvements, I desire to be understood as reserving the right to make whatever changes or modifications may fairly fall within the scope of my invention as defined by the appended claims.

Having described my invention, what I claim and desire to secure by Letters Patent is:

1. A vehicle construction comprising, a vehicle body having a rear endgate opening, an endgate serving as a closure for said opening, a body extension unit adapted to form an extension of the body rearward from the said opening, and disconnectible hinge means between the front end of said extension unit and said endgate opening and similar disconnectible hinge means between said endgate and the rear end of said extension unit permitting interposition of said unit as a body extension between said opening and said endgate.

2. A body extension accessory for a vehicle body having an endgate opening and hinge elements for a removable endgate member, comprising an extension unit adapted to form an extension of the body rearward from the endgate opening, the front end of said unit being provided with hinge elements adapted for removable connection with said first hinge elements and the rear end of said unit having hinge elements adapted for removable connection with said endgate member, thereby permitting interposition of said unit as a body extension accessory between the endgate and endgate opening.

3. A vehicle construction comprising, a body having a rear endgate opening, an endgate serving as a closure for said opening, said body and endgate having disconnectible hinge elements permitting removal of the endgate, a body extension accessory unit adapted to form an extension of the body rearward from said opening, the front end of said unit having hinge elements adapted for removable connection with the hinge elements of said body and the rear end of said unit also having hinge elements adapted for removable connection with the hinge elements of said endgate, thereby permitting interposition of said unit as a body extension accessory between the endgate and endgate opening, and latching means for latching said endgate member in closure relation at either said endgate opening or at the rear end of said extension unit.

ROY D. WHITTINGTON.

REFERENCES CITED

The following references are of record in the file of this patent:

UNITED STATES PATENTS

| Number | Name | Date |
|--------|------|------|
| 750,376 | Lampitt | Jan. 26, 1904 |
| 808,395 | Luscombe | Dec. 26, 1905 |